United States Patent
Yasuda (10) Patent No.: US 8,021,003 B2
(45) Date of Patent: Sep. 20, 2011

(54) PROJECTION DISPLAY APPARATUS HAVING NONVOLATILE MEMORY

(75) Inventor: Hitoshi Yasuda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 12/204,875

(22) Filed: Sep. 5, 2008

(65) Prior Publication Data

US 2009/0067275 A1     Mar. 12, 2009

(30) Foreign Application Priority Data

Sep. 7, 2007     (JP) ................................. 2007-232173

(51) Int. Cl.
*G03B 21/00*     (2006.01)

(52) U.S. Cl. .......................................... 353/122; 353/85

(58) Field of Classification Search ..................... 353/52, 353/85, 122; 348/748; 362/20, 253, 802
See application file for complete search history.

(56) References Cited

U.S. PATENT DOCUMENTS

| | | | | |
|---|---|---|---|---|
| 4,713,553 | A | * | 12/1987 | Townsend et al. ............... 307/64 |
| 4,750,040 | A | * | 6/1988 | Hakamada ..................... 348/725 |
| 5,136,397 | A | * | 8/1992 | Miyashita ..................... 348/748 |
| 2003/0204857 | A1 | | 10/2003 | Dinwiddie et al. |

FOREIGN PATENT DOCUMENTS

| | | |
|---|---|---|
| EP | 0213577 A2 | 3/1987 |
| JP | S58-108932 A | 6/1983 |
| JP | 01-158314 A | 6/1989 |
| JP | 07-261887 A | 10/1995 |
| JP | 11-149419 A | 6/1999 |
| JP | 2003-005287 A | 1/2003 |
| JP | 2004-069997 A | 3/2004 |

* cited by examiner

*Primary Examiner* — Georgia Y Epps
*Assistant Examiner* — Bao-Luan Le
(74) *Attorney, Agent, or Firm* — Canon USA, Inc. IP Division (57) ABSTRACT

A projector 100 includes an image projection unit 6 that projects an image using light from a discharge lamp 1, a ballast 2 that controls a supply voltage supplied to the discharge lamp 1, a system controller 3 that controls a command signal outputted to the ballast 2, a volatile memory 31, a nonvolatile memory 32 that stores data stored in the volatile memory 31, and a power supply unit 4 that includes a capacitor 48 used for generating a supply voltage supplied from an external power supply to the ballast 2. The system controller 3 stores the data of the volatile memory 31 in the nonvolatile memory 32 using a voltage generated by accumulated charges of the capacitor 48 when the external power supply is cut off.

6 Claims, 7 Drawing Sheets

FIG.7

PROJECTION DISPLAY APPARATUS HAVING NONVOLATILE MEMORY

BACKGROUND OF THE INVENTION

The present invention relates to a projection display apparatus projecting images using light from a light source, and more particularly to a projection display apparatus that stores data, for example the data of a volatile memory, in a nonvolatile memory when an external power supply is forcibly cut off.

When a projector is used, a user can individually set some operating parameters such as brightness, color, contrast, and languages. Furthermore, the system of the projector updates and retains information such as a period of lighting, the number of lighting, and error information, by itself.

These data are tentatively stored in a RAM (Random Access Memory) that is a volatile memory. The data stored in the volatile memory are collectively stored in an EEPROM (Electrically Erasable Programmable Read Only Memory) or a FLASH-EEPROM that is a nonvolatile memory at regular time intervals. Such a control is performed since the access speed of the nonvolatile memory is slower than that of the volatile memory, and also the nonvolatile memory may have a limitation on the number of times data can be rewritten.

When an input power is cut off, the data stored in the volatile memory is deleted. However, the data stored in the volatile memory is periodically stored in the nonvolatile memory. Therefore, on the next occasion that input power is supplied to the system in the next time, the system will read the data from the nonvolatile memory and the original data will be restored. However, there is a problem when the input power is forced to be cut off before the updated data in the volatile memory are stored in the nonvolatile memory. In this case, the data that were not stored in the nonvolatile memory can not be restored on the next occasion that input power is supplied to the system in the next time.

Therefore, a conventional projector includes a secondary battery or an electric double layer capacitor that is capable of charging and discharging as a sub-power supply for a backup. Since the projector includes the sub-power supply for a backup, power is supplied from the sub-power supply for a backup when the system of the projector detects that the input power is cut off. The data in the volatile memory is stored in the nonvolatile memory while the power is supplied from the sub-power supply for a backup (See Japanese Patent Laid-Open No. 58-108932 or Japanese Patent No. 3113486).

However, a projection display apparatus including a sub-power supply for a backup increases in cost since it has the sub-power supply. In addition, the reliability as a projector decreases since the mounting area on a base is reduced and the number of devices for the sub-power supply increases.

BRIEF SUMMARY OF THE INVENTION

It is desirable to provide a projection display apparatus that can reliably store data of a volatile memory in a nonvolatile memory when an external power supply is cut off even if the projection display apparatus does not have a sub-power supply for a backup.

It is also desirable to provide a projection display apparatus having a sub-power supply for a backup, which can lengthen the backup time and/or that can miniaturize the sub-power supply for a backup.

A projection display apparatus as one aspect of the present invention includes a light source, a power supply unit which receives power from an external power supply and which supplies to said light source power derived from the received power, a detecting unit which detects a cut-off state in which no or no sufficient power is being received by the power supply unit from the external power supply, a nonvolatile memory for storing data of the projection display apparatus, a capacitor which accumulates charges when power is being received by the power supply unit from the external power supply, and a control unit operable, following detection by the detecting unit of said cut-off state, to carry out a data storage operation in which at least part of said data is stored in the nonvolatile memory, power necessary for carrying out the data storage operation being obtained from the charges previously accumulated by the capacitor.

Further features of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Embodiment 1

First, Embodiment 1 of the present invention will be described.

Figure 1:
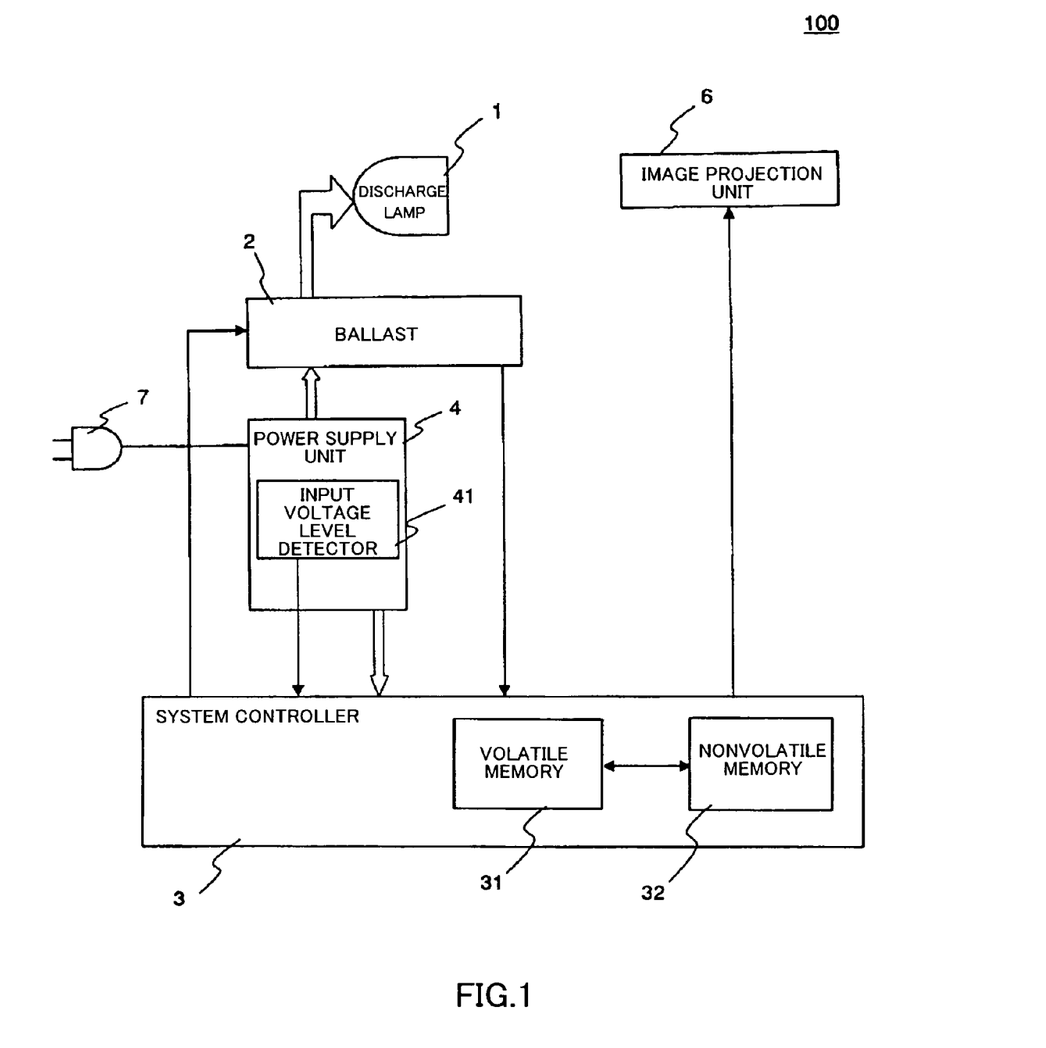
FIG. 1 is a block diagram of a projector in Embodiment 1.

FIG. 1 shows a block diagram of a projector 100 that is a projection display apparatus of the present embodiment.

First, the configuration of the projector 100 will be described. Reference numeral 1 denotes a discharge lamp that is used as a light source of the projector 100. Reference numeral 2 denotes a ballast (a power controller) that performs a lighting control and a constant power control of the discharge lamp 1. The ballast 2 is provided between the discharge lamp 1 and the power supply unit 4 in order to stabilize the power supplied to the discharge lamp 1. Reference numeral 3 denotes a system controller. The system controller 3 performs an output control of a lamp lighting command signal to the ballast 2. The ballast 2 controls the discharge lamp 1 based on the lamp lighting command signal outputted from the system controller 3. The system controller 3 performs a signal processing of projection image signals received from a PC (a personal computer), a video equipment, or the like, connected to the projector 100 and generates image signals that are to be transmitted to a light valve (light modulation element), for example, a liquid crystal panel, which is a part of an image projection unit 6 as described below. Reference numeral 31 denotes a volatile memory such as a RAM (Random Access Memory) that is provided inside the system controller 3. The volatile memory 31 is a memory that is used for temporarily storing various setting data. Reference numeral 32 denotes a nonvolatile memory such as an EEPROM (Electrically Erasable Programmable Read Only Memory) and a FLASH-EEPROM. The nonvolatile memory 32 is a memory for retaining data by storing the data temporarily stored in the volatile memory 31.

Reference numeral 7 denotes an AC power input unit for supplying a power from an AC power supply, for example AC 100V, that is an external power supply.

Reference numeral 4 is a power supply unit that generates various voltages to be supplied to different parts of the projector 100 based on the AC input voltage inputted from the AC power input unit 7. The power supply unit 4 generates DC 370V power for supplying to the ballast 2 and various kinds of constant voltage powers such as DC 5V and DC 12V for supplying to the system controller 3. Reference numeral 41 denotes an input voltage level detector that is provided in the power supply unit 4. The input voltage level detector 41 detects whether or not the AC input voltage supplied from the AC power input unit 7 is higher than a predetermined voltage value, and outputs an AC input voltage detecting signal based on the result of the detection.

Reference numeral 6 denotes an image projection unit for projecting onto a plane to be projected or a screen (not shown) using an illumination light of the discharge lamp 1.

Next, the operation of the projector 100 will be described.

When the AC power input unit 7 is connected to the AC power supply, the power generated by the power supply unit 4 is supplied to each part of the projector 100.

When the power is supplied from the power supply unit 4 to the system controller 3, the system controller 3 performs an initializing processing of each part of the projector 100. The system controller 3 loads the setting data that are stored in the nonvolatile memory 32 into the volatile memory 31.

When a user performs a lamp lighting operation of the projector 100 by an operating part (not shown), the system controller 3 outputs the lamp lighting command signal to the ballast 2. The ballast 2 turns on the discharge lamp 1 based on the lamp lighting command signal outputted from the system controller 3. The ballast 2 performs a constant power control so that the discharge lamp 1 is lit continuously with constant power.

The system controller 3 performs a signal processing of projection image signals received from a PC, a video equipment, or the like, which is connected to the projector 100, and outputs the image signals to a light valve such as a liquid crystal panel that is a part of the image projection unit 6. The image displayed on the light valve (not shown) is projected onto the screen (not shown) by the illumination light.

When the AC input voltage detecting signal outputted from the input voltage level detector 41 is a pulse signal, the system controller 3 determines that the AC input voltage is normally inputted to the power supply unit 4 and does not perform a specific processing.

When the AC power input unit 7 is removed from the AC power supply, the AC power supplied to the projector 100 is forcibly cut off. In case that the AC input voltage is not supplied to the power supply unit 4 of the projector 100 since the AC power is cut off, the input voltage level detector 41 determines that the AC input voltage is lower than a predetermined reference voltage (AC 70V). In this case, the input voltage level detector 41 outputs a high-level AC input voltage detecting signal. When the AC input voltage detecting signal from the input voltage level detector 41 is a high-level signal, the system controller 3 cuts off the lamp lighting command signal outputted to the ballast 2. In other words, the system controller 3 does not output the lamp lighting command signal. Such a lamp turning off control by the system controller 3 is performed by a program of a microprocessor.

After that, the system controller 3 stores the setting data of the volatile memory 31 in the nonvolatile memory 32. When the AC input voltage is supplied to the power supply unit 4 of the projector 100 again, the setting data stored in the nonvolatile memory 32 are loaded into the volatile memory 31. When the external power is supplied, such a control can reflect the setting data immediately before the external power is cut off.

Thus, in the present embodiment, if the AC input voltage is not supplied to the power supply unit 4 of the projector 100, the system controller 3 cuts off the lamp lighting command signal. The lamp turning off control in the system controller 3 is performed via a program of the microprocessor.

Figure 2:
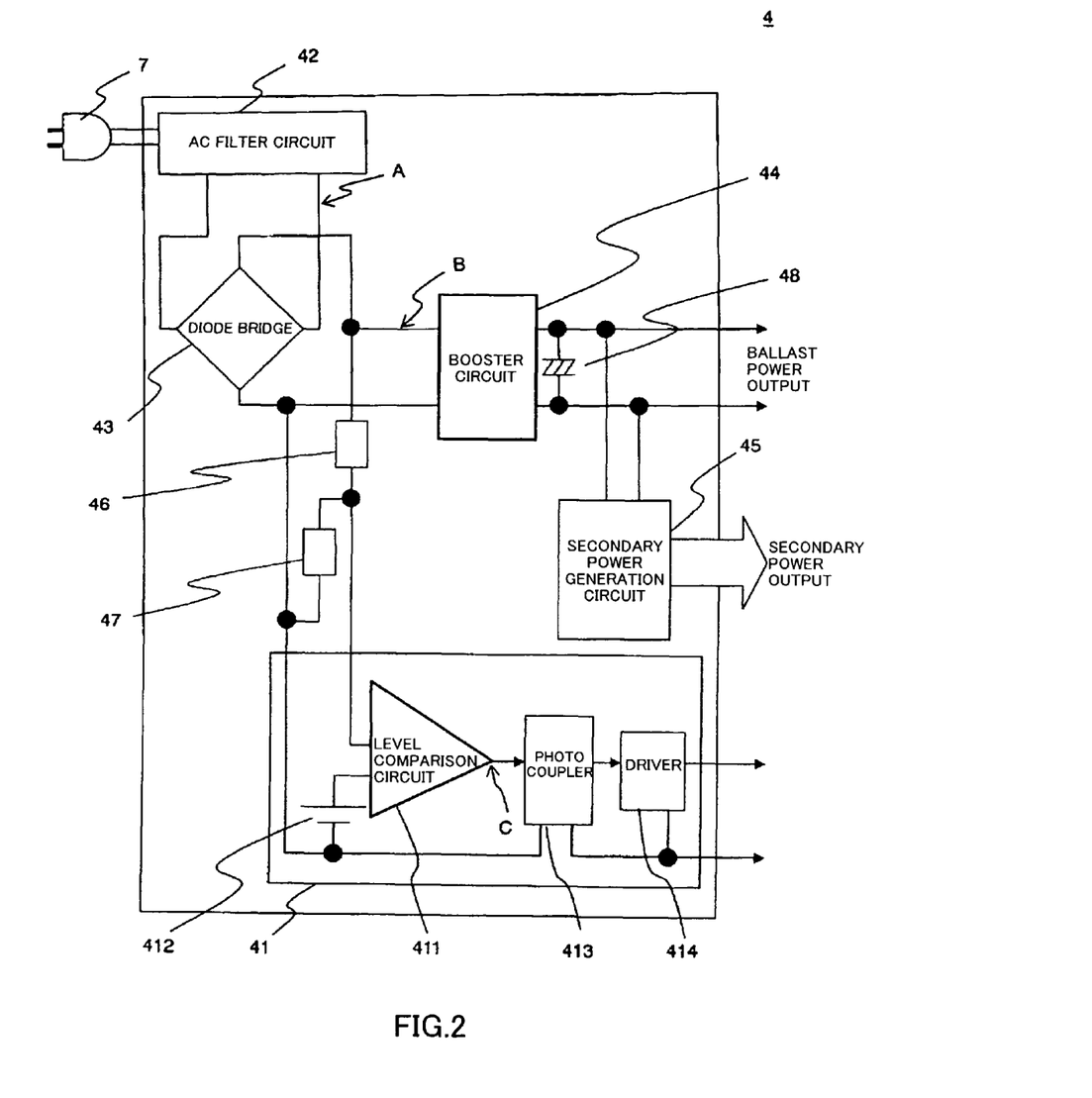
FIG. 2 is a block diagram of a power supply unit of a projector in Embodiment 1.
Figure 3:
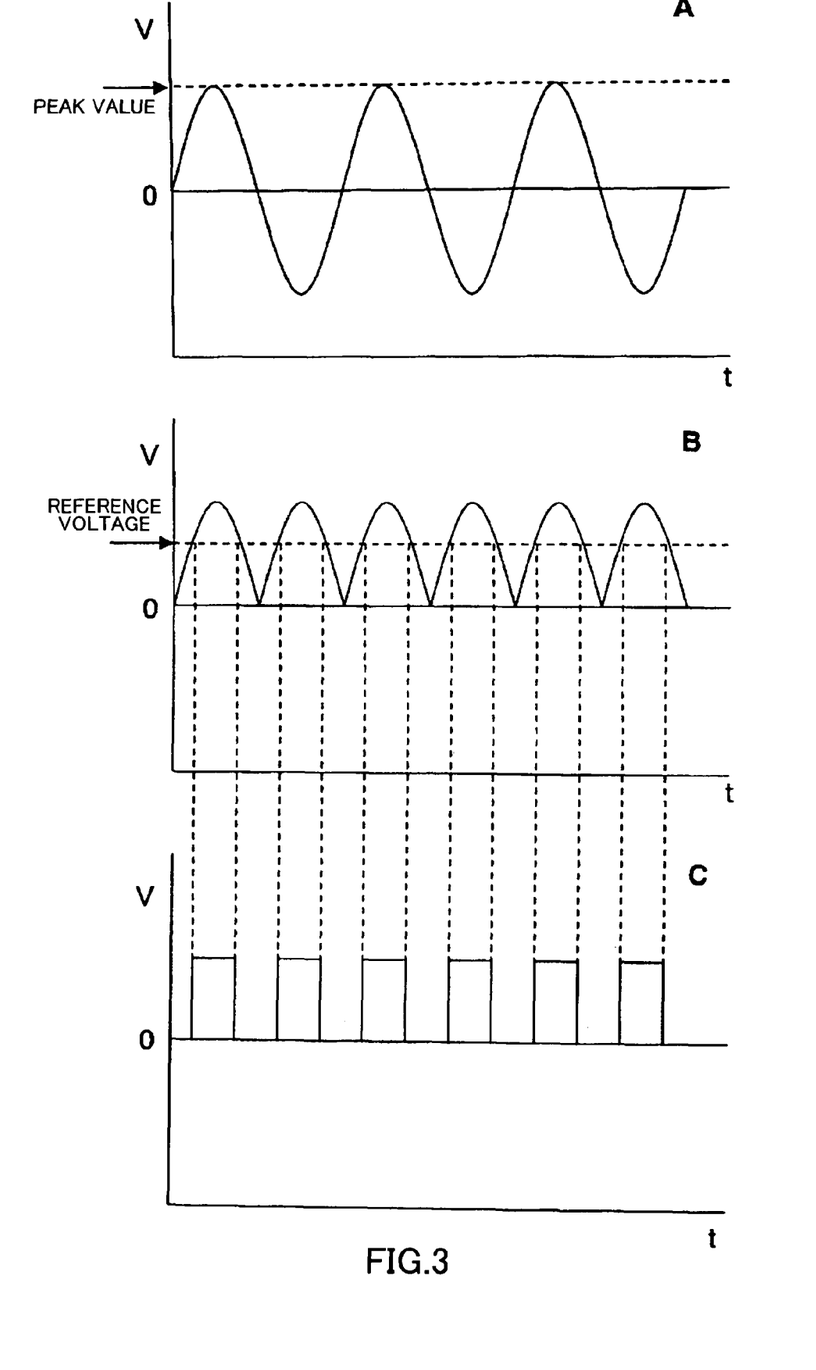
FIG. 3 is a waveform diagram of a power supply unit of a projector in Embodiment 1.

Next, the configuration and the operation of the power supply unit 4 of the projector 100 will be described. FIG. 2 shows a block diagram of the power supply unit 4 of the projector 100. FIG. 3 shows a typical voltage waveform diagram (V-t characteristics) at positions A, B and C in FIG. 2.

The power supply unit 4 includes the input voltage level detector 41, an AC filter circuit 42, a diode bridge 43, a booster circuit 44, a secondary power generating circuit 45, voltage dividing resistors 46 and 47, and a capacitor 48. The input voltage level detector 41 includes a level comparison circuit 411, a reference voltage 412, a photo coupler 413 and a driver 414.

In the AC input voltage inputted from the AC power input unit 7, a noise component in the external supply voltage is filtered out by the AC filter circuit 42. An example waveform in this case is shown as waveform A in FIG. 3. The vertical axis indicates voltage (V), and the horizontal axis indicates time (t). The AC input voltage from which the noise component has been filtered out by the AC filter circuit 42 is full-wave rectified by the diode bridge 43. An example waveform in this case is shown as waveform B in FIG. 3. The voltage full-wave rectified by the diode bridge 43 is boosted to a DC voltage of 370V by the booster circuit 44.

The capacitor 48 operates as a primary smoothing capacitor for smoothing the DC voltage of 370V. At the same time, the capacitor 48 operates so as to protect the discharge lamp 1 in the instantaneous power failure. The capacitor 48 is also used for generating the supplied voltage that is supplied from the AC power supply to the ballast 2.

The DC voltage of 370V that has been smoothed by the capacitor 48 is directly supplied to the ballast 2 as a power for lighting the lamp. This DC voltage is supplied to the secondary power generating circuit 45. Various kinds of secondary power are generated by the secondary power generating circuit 45 and supplied to the system controller 3. A suitable constant supply voltage (DC 5V, DC 12V, or the like) is supplied to each part of the system controller 3.

The input voltage level detector 41 monitors the voltage rectified by the diode bridge 43 (the waveform B in FIG. 3). A monitoring voltage is generated by dividing the output voltage of the diode bridge 43 using the voltage dividing resistors 46 and 47. The level comparison circuit 411 provided in the input voltage level detector 41 compares this monitoring voltage with the reference voltage 412.

When the rectified AC input voltage is higher than the reference voltage 412, the level comparison circuit 411 outputs a high-level signal. Therefore, when the peak value of the AC input voltage (the waveform A in FIG. 3) is higher than a predetermined voltage value set as the reference voltage (the waveform B in FIG. 3), the level comparison circuit 411 outputs a square wave pulse (the waveform C in FIG. 3). Incidentally, there is a voltage drop of two diode drops in the diode bridge so actually the level comparison circuit 411 outputs a square wave pulse (the waveform C in FIG. 3 when the peak value of the AC input voltage (the waveform A in FIG. 3) is higher by two diode drops than the reference voltage (the waveform B in FIG. 3). Since this square wave pulse is formed based on the comparison between a DC voltage obtained by rectifying the AC input voltage and the reference voltage, its frequency is twice as high as that of the AC input voltage.

On the other hand, when the rectified AC input voltage is lower than the reference voltage 412, the level comparison circuit 411 outputs a low-level signal.

The output voltage of the level comparison circuit 411 (the waveform C in FIG. 3) is transmitted to the secondary power system from the primary power system via the photo coupler 413. The signal outputted from the photo coupler 413 is inputted to the system controller 3 and the switching unit 5 via the driver 414.

The driver 414 includes a switching device such as a MOSFET. The switching device in the present embodiment has characteristics in which the switching device conducts when a low-level signal is inputted and it interrupts when a high-level signal is inputted. Therefore, when the peak value of the AC input voltage is lower than the reference voltage, the driver 414 outputs a high-level constant signal.

The operations of the system controller 3 after that are the same as described above.

Next, a method for processing in the system controller 3 will be described.

Figure 4:
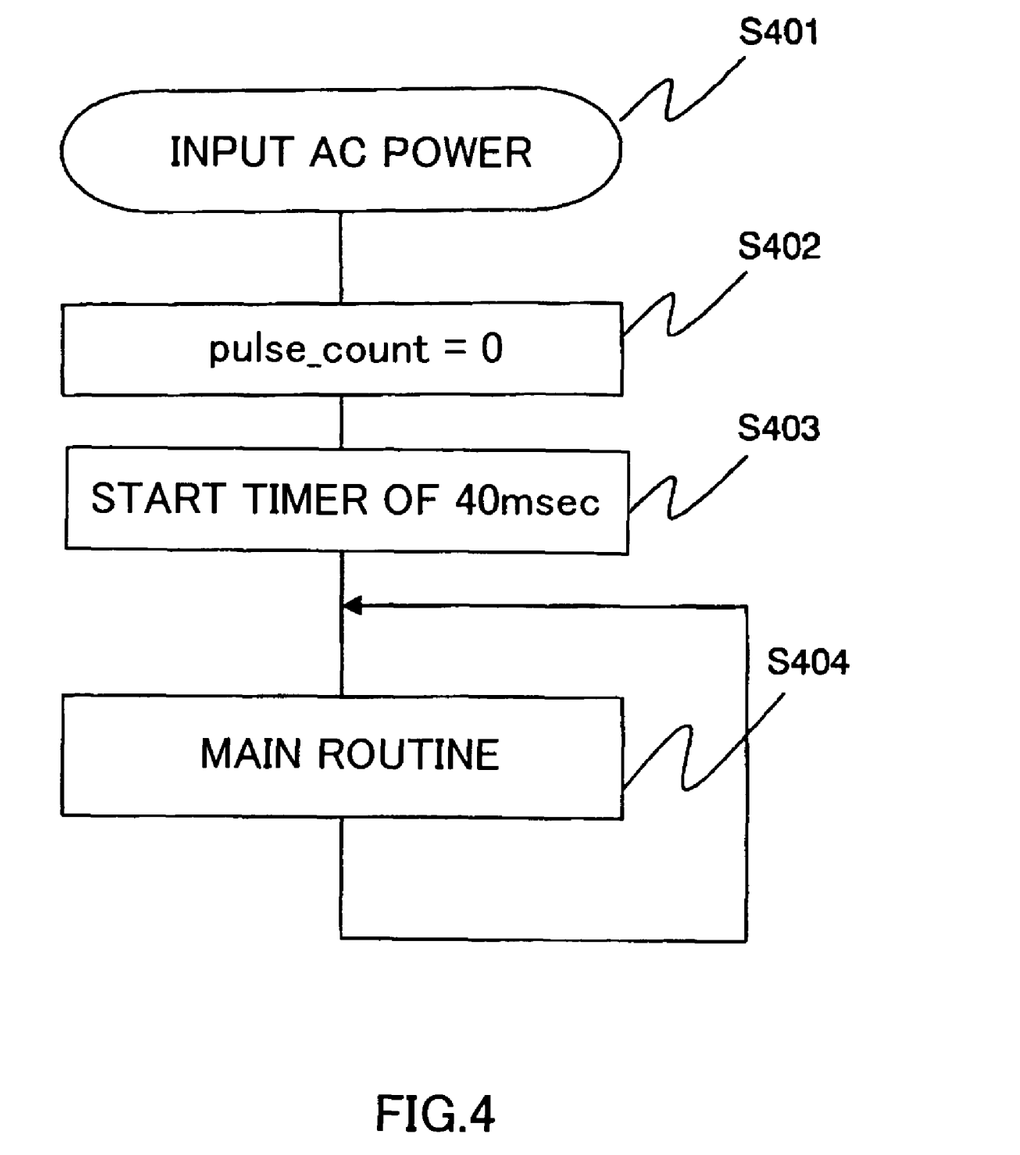
FIG. 4 is a flowchart showing a MAIN processing routine of an AC input voltage detecting signal in Embodiment 1.

FIG. 4 is a flowchart showing a MAIN processing routine with respect to the AC input voltage detecting signal in the system controller 3. When the AC power supply for the projector 100 is turned on (S401), the system controller 3 sets "pulse_count=0" as an initial value (S402). The system controller 3 also starts a timer whose cycle is 40 msec (S403) and performs the processing of the MAIN routine (S404). As explained above, a pulse signal is outputted from the driver 414 when the AC input voltage is higher than a predetermined value. The "pulse_count" indicates the number of times pulse signals have been detected by the system controller 3 at an interrupt input thereof. The pulse can be detected either at its rising edge or at its falling edge. The pulse can be also detected at both its rising edge and its falling edge.

When no pulse is present in the AC input voltage detecting signal during the timer period of 40 msec, the system controller 3 determines that the input of the AC power has been cut off. The period of the timer of the present embodiment is set to, but is not limited to, 40 msec. In the present embodiment, the value of 40 msec is set considering the time needed for withstanding an instantaneous power failure or an instantaneous voltage drop. However, it is also possible to use a timer having a period longer than 40 msec or shorter than 40 msec in accordance with other conditions such as specifications of the projector.

Figure 5:
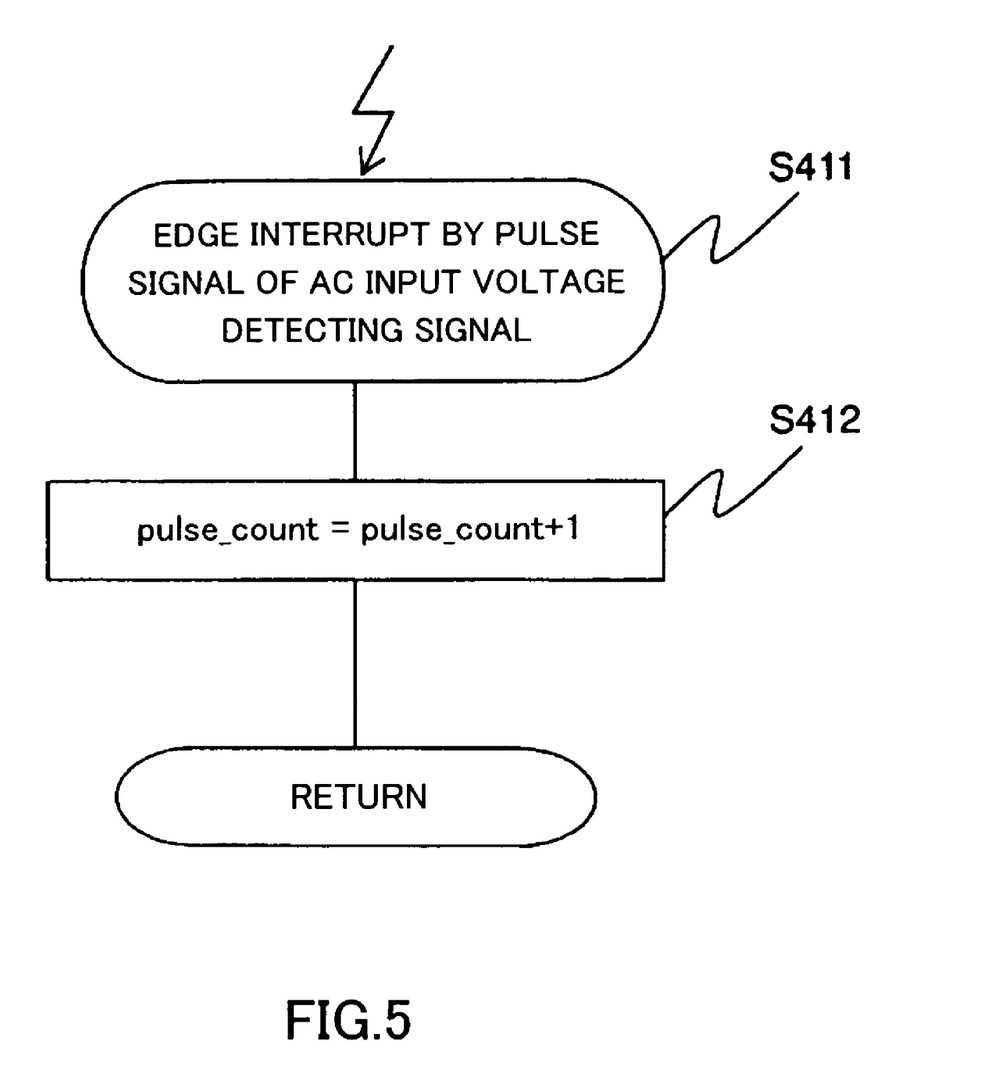
FIG. 5 is a flowchart of an edge interrupt count processing routine by an AC input voltage detecting signal in Embodiment 1.

FIG. 5 is a flowchart showing a count processing routine of the edge interrupt by the pulse signal of the AC input voltage detecting signal. When the AC input voltage is higher than a predetermined value, i.e. AC 70V in the present embodiment, the pulse signal outputted from the driver 414 is inputted to the system controller 3. Each pulse signal corresponds to an "edge interrupt" (S411). The "pulse_count" for counting the number of occurrences of the edge interrupt is incremented (S412).

Figure 6:
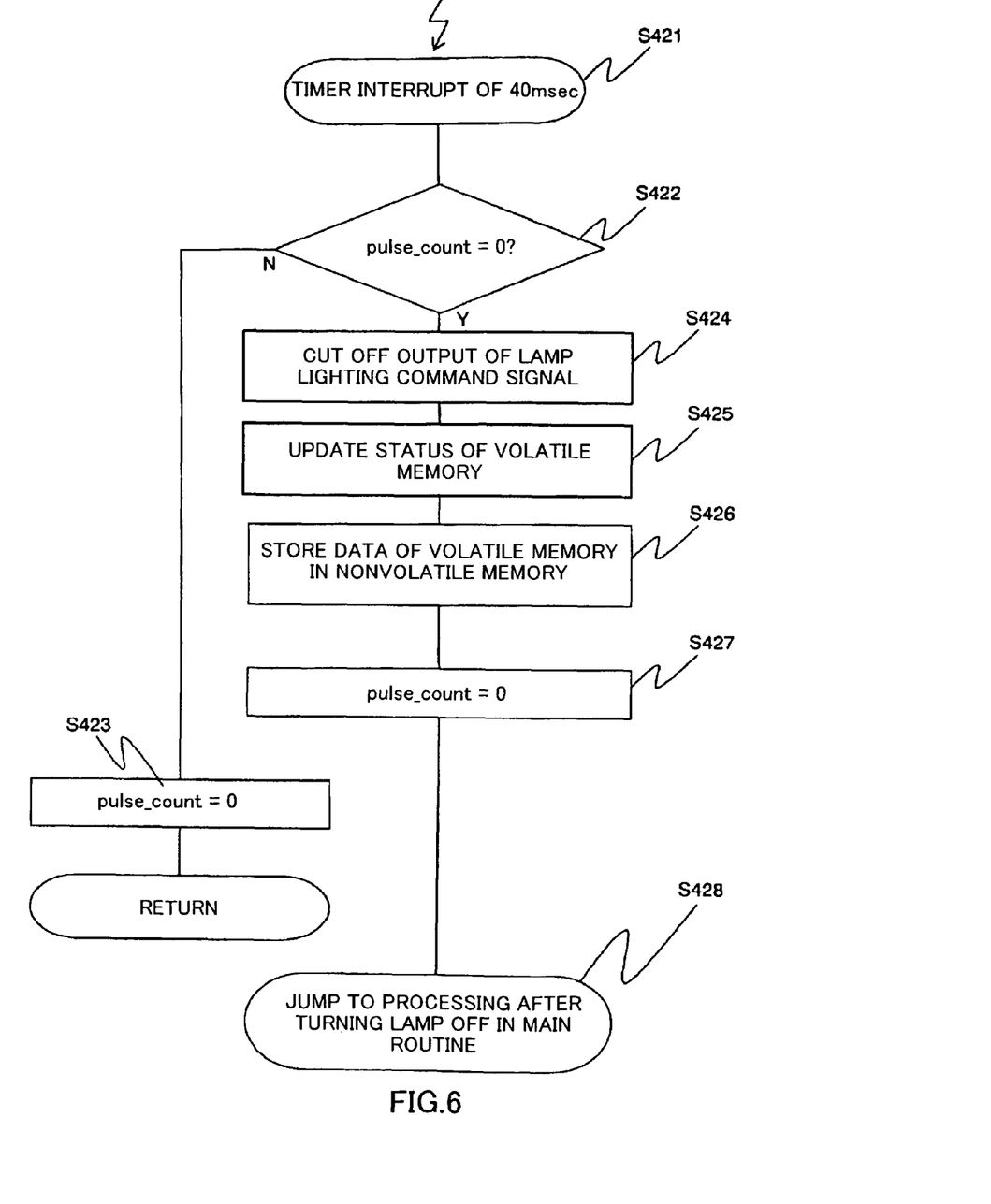
FIG. 6 is a flowchart of a processing routine when an AC power supply is cut off in Embodiment 1.

FIG. 6 is a flowchart showing an interrupt processing routine used to detect when the input of the AC power has been cut off. The FIG. 6 processing routine is carried out each time a "timer interrupt" is received from the timer (S421). Such timer interrupts are generated by the timer at intervals of 40 msec in the present embodiment. At first, the system controller 3 determines whether or not a pulse edge interrupt from the driver 414 has occurred within the latest 40 msec period (S422). If a pulse edge interrupt has occurred at least once during the period of 40 msec, the system controller 3 determines that AC power is being received. In this case, it clears the "pulse_count" (S423) and exits the FIG. 6 interrupt processing routine.

On the other hand, if no edge interrupt has never occurred during the latest 40 msec period, the system controller 3 determines that the AC power has been cut off. Immediately after the AC power is cut off, enough charges are accumulated in the capacitor 48 that is included in the power supply unit 4. Therefore, the data in the volatile memory 31 can be stored in the nonvolatile memory 32 using a voltage that is generated by the charges accumulated in the capacitor 48. The capacitor 48 has a high capacity for effectively protecting the discharge lamp 1 in the instantaneous power failure. However, when the output of the lamp lighting command signal is maintained, the charges accumulated in the capacitor 48 are discharged in a short time.

In the present embodiment, firstly, the output of the lamp lighting command signal is cut off (S424). The discharge lamp 1 is turned off by cutting the lamp lighting command signal off. Therefore, the charges previously accumulated in the capacitor 48 are enough to store the data of the volatile memory 31 in the nonvolatile memory 32. After the lamp lighting command signal is cut off, the data showing the current status are updated for the volatile memory 31 (S425), and the data in the volatile memory 31 is stored in the nonvolatile memory 32 (S426). Next, the "pulse_count" is cleared to zero (S427) and the routine jumps to a processing that is normally performed after the lamp is turned off (S428).

Embodiment 2

Next, embodiment 2 of the present invention will be described.

Figure 7:
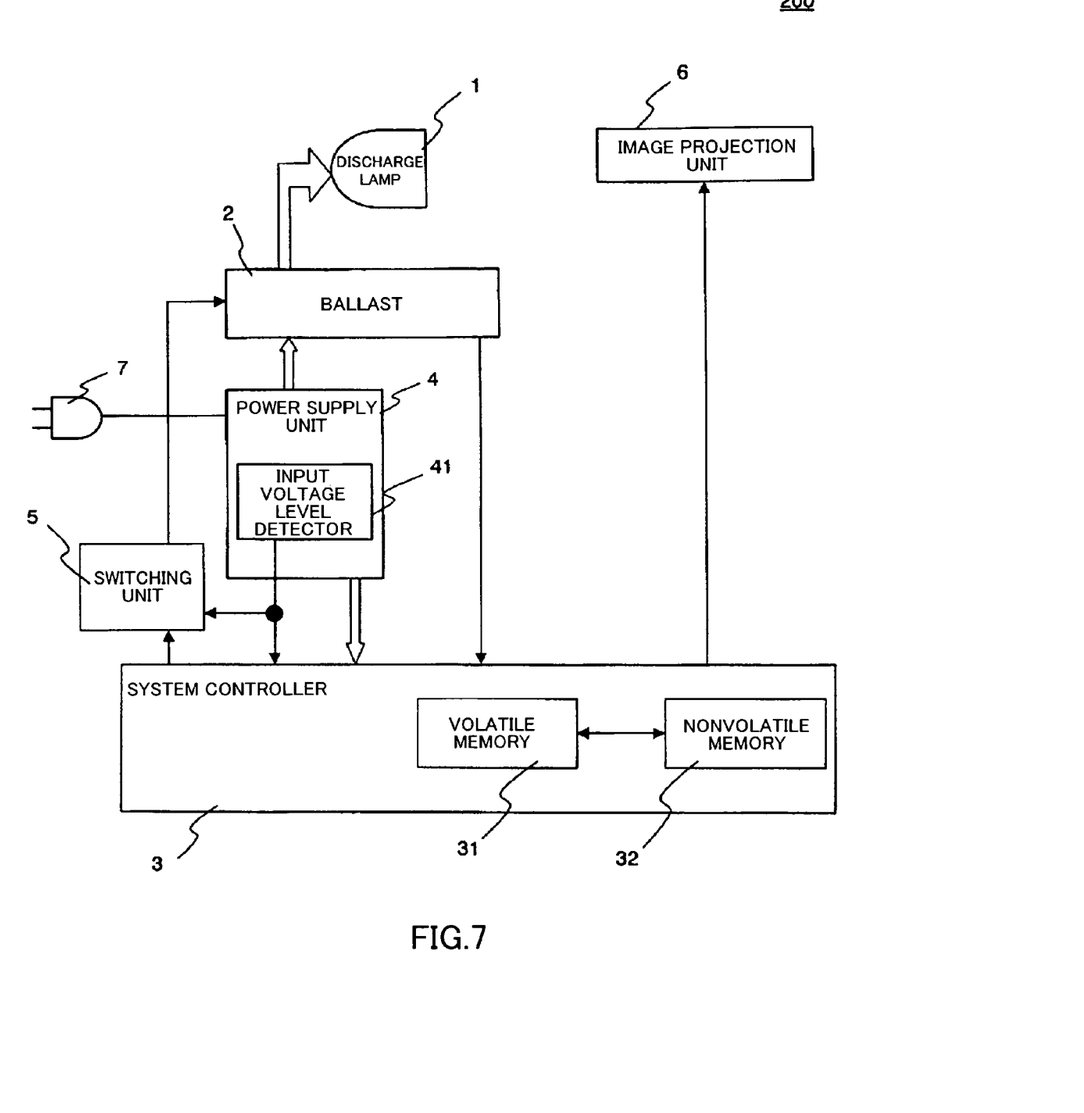
FIG. 7 is a block diagram of a projector in Embodiment 2.

FIG. 7 shows a block diagram of a projector 200 that is a projection display apparatus of the present embodiment. In the present embodiment, the description of the configurations and the operations of embodiment 2 which are the same as that of embodiment 1 will be omitted, and the description will be focused on the configurations and the operations which are different from those of embodiment 1.

The configuration of the present embodiment is different from that of embodiment 1 in that a switching unit 5 is provided between the system controller 3 and the ballast 2.

The switching unit 5 is provided as a hardware circuit and includes components such as MOSFETs and transistors. The switching unit 5 controls the transmission of the lamp lighting command signal that is outputted from the system controller 3 to the ballast 2 by its ON/OFF action. In other words, the switching unit 5 passes, or blocks passage of, the lamp lighting command signal from the system controller 3 to the ballast 2 based on the AC input voltage detecting signal from the input voltage level detector 41 provided in the power supply unit 4.

While the projector 200 is operating, when the AC input voltage inputted to the power supply unit 4 is higher than a predetermined reference voltage, for example AC 70V, the input voltage level detector 41 outputs a predetermined AC input voltage detecting signal to the system controller 3 and the switching unit 5. In the present embodiment, the AC input voltage detecting signal in this time is a pulse signal which changes repetitively between a low level and a high level.

When the AC input voltage detecting signal from the input voltage level detector 41 is the pulse signal, the switching unit 5 makes an internal switch conductive so as not to cut off the lamp lighting command signal outputted from the system controller 3 to the ballast 2.

When the AC power input unit 7 is removed from the AC power supply, the AC power which is being supplied to the projector 200 is forcibly cut off. In this case, the input voltage level detector 41 outputs a high-level AC input voltage detecting signal to the system controller 3 and the switching unit 5. When the AC input voltage detecting signal from the input voltage level detector 41 is a constant high-level signal, the system controller 3 cuts off the lamp lighting command signal that is being outputted to the ballast 2.

The lamp turning off control in the system controller 3 is performed by a program of a microcomputer. However, the software turning off control by the program of the microcomputer sometimes cannot perform the control at a high enough speed to lower the discharge amount (prevent consumption) of the charges accumulated in the capacitor 48.

Therefore, the switching unit 5 of the present embodiment cuts off the lamp lighting command signal outputted to the ballast 2 when the high-level AC input voltage detecting signal from the input voltage level detector 41 is inputted to the switching unit 5. In this case, the projector 200 can perform a high-speed cutting off control since the lamp lighting signal is cut off by the switching unit 5 that is a hardware circuit.

Thus, in the present embodiment, when the AC input voltage is not supplied to the power supply unit 4 of the projector 200, in addition to the software control of the lamp lighting command signal performed by the microcomputer of the system controller 3, a hardware control is performed by the switching unit 5. In other words, the projector 200 performs the cutting off control of the lamp lighting command signal at two places of the system controller 3 and the switching unit 5 when the AC input voltage is not supplied to the projector 200.

Therefore, the present embodiment is effective particularly when the capacity of the capacitor 48 is small or the amount of the data that are to be stored in the nonvolatile memory 32 is large, for example.

If no problem occurs in the projector 200 when the lamp cutting off control is performed exclusively by the software operated in the system controller 3, the lamp cutting off control performed exclusively by the system controller 3 is enough. In this case, the lamp cutting off control by the switching unit 5 can be omitted, and the configuration is the same as that of embodiment 1. Whether or not the lamp cutting off processing exclusively by the system controller 3 is enough depends on the system to be applied. Therefore, for each system it needs to be confirmed whether or not the control only by the system controller 3 is enough. If it is confirmed that no problem occurs, the control by the switching unit 5 can be omitted.

While the present invention has been specifically described with reference to exemplary embodiments, it is to be understood that the invention is not limited to the disclosed exemplary embodiments and various variations and modifications may be made without departing from the scope of the present invention.

For example, in the above embodiments, the system controller 3 performs the operation for storing the data in the nonvolatile memory 32 after it performs the operation for turning the discharge lamp 1 off. However, the order is not limited to this. The order can be changed when the capacity of the capacitor 48 provided in the power supply unit 4 is comparably large or the amount of data that are to be stored in the nonvolatile memory 32 is comparatively small.

The system controller 3 can also give instructions so as to cut the discharge lamp 1 off after giving instructions to store the data in the nonvolatile memory 32 and before completing to store the data in the nonvolatile memory 32. If a large-capacity capacitor is used as the capacitor 48, the system controller 3 can also give instructions so as to cut the discharge lamp 1 off after completing to store the data in the nonvolatile memory 32.

In the above embodiments, projection display apparatuses using an AC power as an input power were explained. Instead, a projection display apparatus using a DC power as an input power can be also adopted.

The projection display apparatus can include a secondary battery, an electric double layer capacitor, or the like, which is capable of charging or discharging. In this case, applying each of the above embodiments can lengthen the time in which a backup is possible by a sub-power supply or miniaturize the sub-power supply.

As discussed, each of the above embodiments can provide a projection display apparatus that has a high reliability at a low cost since it stores data of a volatile memory in a nonvolatile memory using a capacitor provided in a power supply unit.

In a preferred embodiment, if the projection display apparatus detects that an AC power is cut off, firstly, it turns off a discharge lamp that is a light source, after that, it stores the data of the volatile memory in the nonvolatile memory. Therefore, it can extend the discharge time of charges accumulated in the capacitor provided in the power supply unit. It can store the data of the volatile memory in the nonvolatile memory during the extended period of time. Accordingly, the projection display apparatus does not have to include a sub-power supply exclusively for a backup, unlike conventional one. Thus, it can reduce the cost and the mounting area of the board, and improve the reliability.

The projection display apparatus including a sub-power supply for a backup can lengthen a time in which a backup is possible after an AC power was cut off. Therefore, it can increase the amount of the backup processing or it can miniaturize the sub-power supply for the backup.

If the projection display apparatus includes a switching unit and is configured to turn off the light source directly by a hardware based on an AC input voltage detecting signal, it can stably turn off the light source at a high speed without depending on the processing time of a microcomputer of a system controller.

The scope of the following claims is to be accorded the broadest interpretation so as to encompass all modifications, equivalent structures and functions.

This application claims the benefit of Japanese Patent Application No. 2007-232173, filed on Sep. 7, 2007, which is hereby incorporated by reference herein in its entirety.

What is claimed is:
1. A projection display apparatus, comprising:
a light source;
a power supply unit which receives power from an external power supply and which supplies power derived from the received power to the light source;
a detecting unit which detects a cut-off state in which no or no sufficient power is being received by the power supply unit from the external power supply;
a nonvolatile memory for storing data of the projection display apparatus;

a capacitor which accumulates charges when power is being received by the power supply unit from the external power supply, and forms part of the power supply unit; and a control unit operable, following detection by the detecting unit of the cut-off state, to carry out a data storage operation in which at least part of the data is stored in the nonvolatile memory, wherein power necessary for carrying out the data storage operation is obtained from charges previously accumulated by the capacitor, wherein the control unit is operable, following detection by the detecting unit of the cut-off state, to prevent charges previously accumulated by the capacitor from being consumed by the light source.

2. The projection display apparatus according to claim 1, wherein the control unit is operable, following detection of the cut-off state, to carry out at least part of the data storage operation after turning off the light source.

3. The projection display apparatus according to claim 1, wherein the power supply unit is adapted to receive AC power from the external power supply, and the detecting unit comprises a pulse generating unit which generates pulses at a frequency dependent on a frequency of the received AC power and is operable to detect the cut-off state when no such pulses are generated by the pulse generating unit in a preset time period.

4. The projection display apparatus according to claim 1, further comprising: a volatile memory for storing data of the projection display apparatus when power is being received by the power supply unit from the external power supply, wherein the control unit is operable in the data storage operation to transfer some or all of the data stored in the volatile memory to the nonvolatile memory.

5. The projection display apparatus according to claim 1, further comprising:

an image projection unit which projects an image using light of the light source; and a power controller which controls a supply voltage supplied to the light source in dependence upon a command signal outputted by the control unit.

6. The projection display apparatus according to claim 5, wherein the control unit comprises a system controller adapted to execute one or more programs and further comprises a switching unit, provided between the system controller and the power controller, and implemented in hardware, wherein the switching unit is operable to block passage of the command signal from the system controller to the power controller following detection of the cut-off state by the detection unit.

* * * * *